United States Patent [19]
Gombos

[11] Patent Number: 5,909,990
[45] Date of Patent: Jun. 8, 1999

[54] THREADLESS NUT

[76] Inventor: Joseph Gombos, 70 Wimborne Avenue, Hayes, Middlesex UB4 0HH, United Kingdom

[21] Appl. No.: 09/116,986

[22] Filed: Jul. 16, 1998

[51] Int. Cl.$^6$ .............................. F16B 37/08; F16B 39/34
[52] U.S. Cl. ......................... 411/302; 411/432; 411/908
[58] Field of Search .................................. 411/301, 302, 411/303, 304, 432, 902, 907, 908

[56] References Cited

U.S. PATENT DOCUMENTS

| | | | |
|---|---|---|---|
| 131,945 | 10/1872 | Dunlap | 411/301 |
| 1,071,841 | 9/1913 | Whitman | 411/303 |
| 2,102,489 | 12/1937 | Simmonds | 411/303 |
| 2,726,101 | 12/1955 | Peterson | 411/301 X |

FOREIGN PATENT DOCUMENTS 1062703  4/1954  France .................................. 411/302

*Primary Examiner*—Neill Wilson

[57] ABSTRACT

A new threadless nut for use with a threaded bolt to form a secure fastener. The inventive device includes a body having opposite first and second faces, and inner and outer side surfaces. The inner side surface of the body defines a bore through the body between the first and second faces of the body. The inner side surface of the body has first and second portions. The diameter of the second portion of the inner side surface is greater than the diameter of the first portion of the inner side surface such that an annular shoulder is formed between the first and second portions of the inner side surface. An annular liner is provided on the second portion of the inner side surface.

1 Claim, 2 Drawing Sheets

THREADLESS NUT

BACKGROUND OF THE INVENTION

1. Field of the Invention

The present invention relates to nuts and more particularly pertains to a new threadless nut for use with a threaded bolt to form a secure fastener.

2. Description of the Prior Art

The use of nuts is known in the prior art. More specifically, nuts heretofore devised and utilized are known to consist basically of familiar, expected and obvious structural configurations, notwithstanding the myriad of designs encompassed by the crowded prior art which have been developed for the fulfillment of countless objectives and requirements.

Known prior art nuts include U.S. Pat. No. 5,553,984; U.S. Pat. No. 4,815,920; U.S. Pat. No. Des. 319,005; U.S. Pat. No. 5,033,925; U.S. Pat. No. 748,882; and U.S. Pat. No. 3,004,776.

These prior art nuts generally have threads provided on the inner surface of the body of the nut forming the central bore of the nut. While prior art nuts can securely hold a threaded bolt threaded therein, these nuts are limited to accepting threaded bolts of having a thread pitch corresponding to the thread pitch of the nut. If the thread pitches are not equal, stripping of the threads on the nut and bolt may occur which leads to a poor and loose coupling of the nut to the bolt. This problem is exacerbated when working with several variously pitched bolts. With prior art nuts, the user must spend time searching for a nut that properly fits the pitch of each particular bolt in use. This can be extremely time consuming and very difficult when working in constrained spaces or in poor visibility locations.

In these respects, the threadless nut according to the present invention substantially departs from the conventional concepts and designs of the prior art, and in so doing provides an apparatus primarily developed for the purpose of use with a threaded bolt to form a secure fastener.

SUMMARY OF THE INVENTION

In view of the foregoing disadvantages inherent in the known types of nuts now present in the prior art, the present invention provides a new threadless nut construction wherein the same can be utilized for use with a threaded bolt to form a secure fastener.

The general purpose of the present invention, which will be described subsequently in greater detail, is to provide a new threadless nut apparatus and method which has many of the advantages of the nuts mentioned heretofore and many novel features that result in a new threadless nut which is not anticipated, rendered obvious, suggested, or even implied by any of the prior art nuts, either alone or in any combination thereof.

To attain this, the present invention generally comprises a body having opposite first and second faces, and inner and outer side surfaces. The inner side surface of the body defines a bore through the body between the first and second faces of the body. The inner side surface of the body has first and second portions. The diameter of the second portion of the inner side surface is greater than the diameter of the first portion of the inner side surface such that an annular shoulder is formed between the first and second portions of the inner side surface. An annular liner is provided on the second portion of the inner side surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new threadless nut apparatus and method which has many of the advantages of the nuts mentioned heretofore and many novel features that result in a new threadless nut which is not anticipated, rendered obvious, suggested, or even implied by any of the prior art nuts, either alone or in any combination thereof.

It is another object of the present invention to provide a new threadless nut which may be easily and efficiently manufactured and marketed.

It is a further object of the present invention to provide a new threadless nut which is of a durable and reliable construction.

An even further object of the present invention is to provide a new threadless nut which is susceptible of a low cost of manufacture with regard to both materials and labor, and which accordingly is then susceptible of low prices of sale to the consuming public, thereby making such threadless nut economically available to the buying public.

Still yet another object of the present invention is to provide a new threadless nut which provides in the apparatuses and methods of the prior art some of the advantages thereof, while simultaneously overcoming some of the disadvantages normally associated therewith.

Still another object of the present invention is to provide a new threadless nut for use with a threaded bolt to form a secure fastener.

Yet another object of the present invention is to provide a new threadless nut which includes a body having opposite first and second faces, and inner and outer side surfaces. The inner side surface of the body defines a bore through the body between the first and second faces of the body. The inner side surface of the body has first and second portions. The diameter of the second portion of the inner side surface is greater than the diameter of the first portion of the inner side surface such that an annular shoulder is formed between the first and second portions of the inner side surface. An annular liner is provided on the second portion of the inner side surface.

Still yet another object of the present invention is to provide a new threadless nut that allows threadable extension therein of threaded bolts having variously pitched threads (such as: metric, American Fines, Whitworth, British Standard Fines, U.N.C., B.A., B.S.P., and U.N.F.)so that a user can use a common type of nut to thread on to variously pitched threaded bolts. This is especially handy when working with similar diameter bolts having different pitched threads, such as, for example, metric 10 mm bolts having a 2.5 pitch and 10 mm bolts having 1.25 pitch. With this nut, a user does not have to spend a lot of time trying to match a bolt with the proper nut having the same thread pitch.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
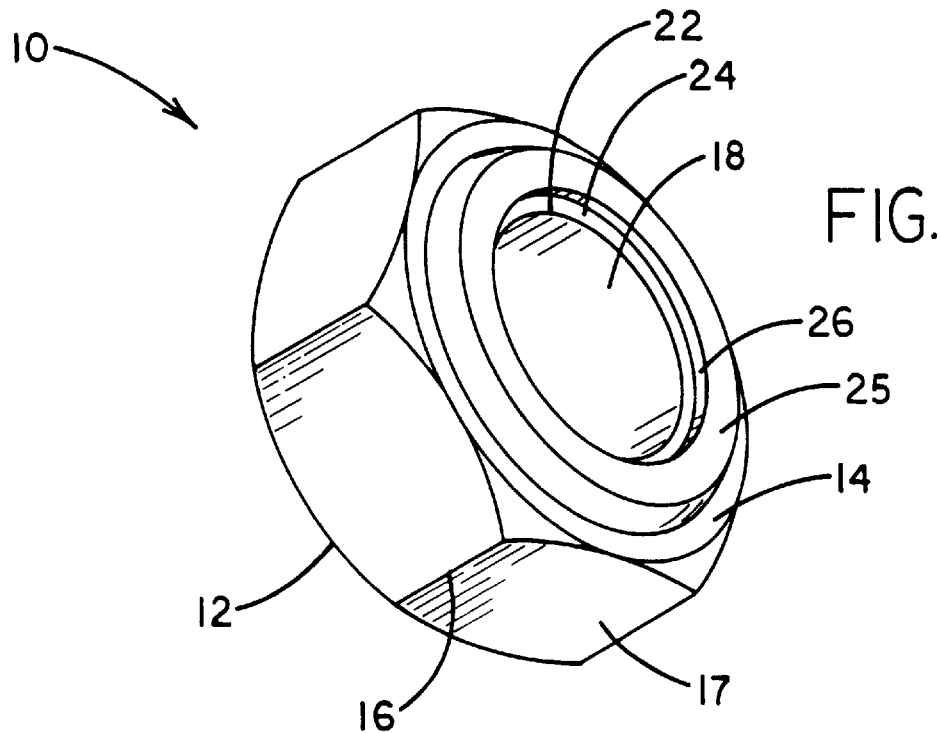
FIG. 1 is a schematic perspective view of a new threadless nut according to the present invention.
Figure 2:
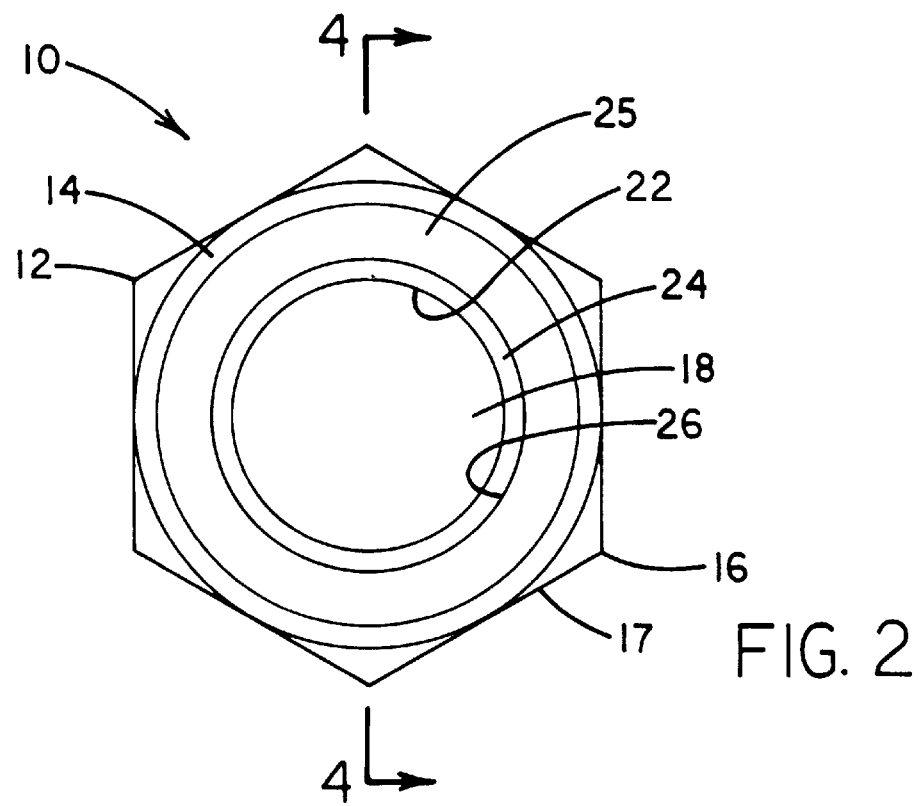
FIG. 2 is a schematic plan view of the present invention.
Figure 3:
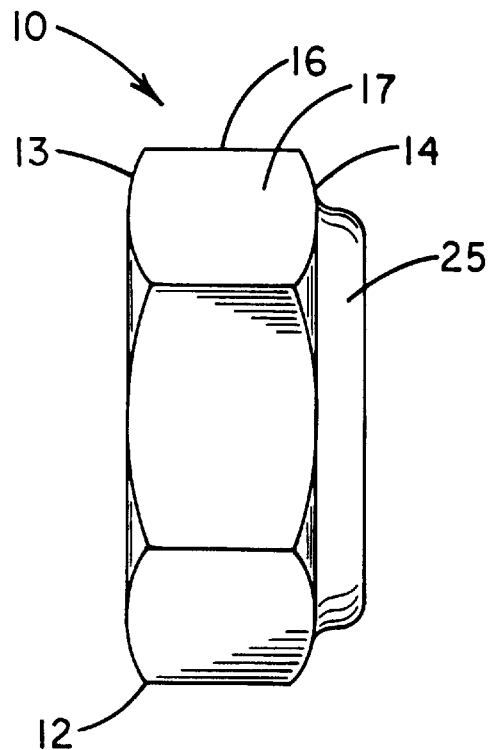
FIG. 3 is a schematic side view of the present invention.
Figure 4:
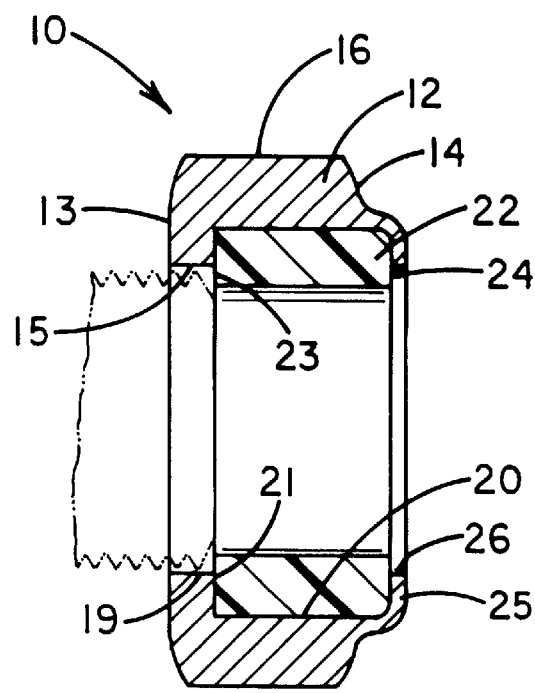
FIG. 4 is a schematic cross-sectional view of the present invention taken from line 4—4 of FIG. 2.

With reference now to the drawings, and in particular to FIGS. 1 through 4 thereof, a new threadless nut embodying the principles and concepts of the present invention and generally designated by the reference numeral 10 will be described.

As best illustrated in FIGS. 1 through 4, the threadless nut 10 generally comprises a body 12 having opposite first and second faces 13,14, and inner and outer side surfaces 15,16. The inner side surface 15 of the body 12 define a bore 18 through the body 12 between the first and second faces 13,14 of the body 12. The inner side surface 15 of the body 12 has first and second portions 19,20. The diameter of the second portion 20 of the inner side surface 15 is greater than the diameter of the first portion 19 of the inner side surface 15 such that an annular shoulder 21 is formed between the first and second portions 19,20 of the inner side surface 15. An annular liner 22 is provided on the second portion 20 of the inner side surface 15.

The threadless nut 10 is designed for permitting threadable extension of variously pitched threaded bolts therethrough. The body 12 has opposite a center axis, first and second faces 13,14, and inner and outer side surfaces 15,16. Unlike prior art nuts, the inner side surface 15 is generally smooth while the outer side surface 16 is generally polygonal and has a number of generally flat sides 17. Ideally, the outer side surface is generally hexagonal. The sides 17 of the outer side surface 16 are designed for engaging the jaws of a wrench holding or turning the threadless nut 10.

The inner side surface 15 of the body 12 defines a bore 18 through the body 12 between the first and second faces 13,14 of the body 12. The bore 18 has a center axis which is coaxial with the center axis of the body 12. The inner side surface 15 of the body 12 also has first and second portions 19,20. The first and second portions 19,20 of the inner side surface 15 of the body 12 are each generally cylindrical and have a center axis which are coaxial with the center axis of the body 12. The first portion 19 of the inner side surface 15 is positioned adjacent the first face 13 of the body 12 and the second portion 20 of the inner side surface 15 is positioned adjacent the second face 14 of the body 12. The diameter of the second portion 20 of the inner side surface 15 is greater than the diameter of the first portion 19 of the inner side surface 15 such that an annular shoulder 21 is formed between the first and second portions 19,20 of the inner side surface 15.

An annular liner 22 is provided around the second portion 20 of the inner side surface 15. The liner 22 has a center axis which is preferably coaxial with the center axis of the body 12. The inner diameter of the liner 22 is less than the diameter of the first portion 19 of the inner side surface 15. The outer diameter of the liner 22 is greater than the diameter of the first portion 19 of the inner side surface 15. The liner 22 has a first end 23 abutting the shoulder 21 and a second end 24 positioned adjacent the second face 14 of the body 12. The second face 14 of the body 12 has an annular flange 25 radiating inwards towards the center axis of the body 12 and into the opening of the bore 18. The diameter of the inner edge 26 of the annular flange 25 is preferably generally equal to the diameter of the first portion 19 of the inner side surface 15. The annular flange 25 abuts the second end 24 of the liner 22. The annular flange 25 is designed for helping hold the liner 22 in position in the bore 18 against the second portion 20 of the inner side surface 15. The liner 22 comprises a malleable material, such as a polymeric resin compound or plastic, that can be cut into by the engaging threads of a threaded bolt threadably extended into the bore 18 of the body 12 such that the bolt is securely held to the nut.

In use, this nut 10 allows secure threaded insertion bolts of any pitch of threads. Threaded bolts are inserted into the bore of the threadless nut 10. As the bolt is twisted, the threads of the bolt cut into the liner so that the liner engages the bolt to hold the bolt to the nut.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A threadless nut for permitting threadable extension of variously pitched threaded bolts therethrough, comprising:

a body having a center axis, opposite first and second faces, and inner and outer side surfaces, said inner surface being generally smooth;

said outer side surface being generally polygonal and having a number of generally flat sides, wherein said outer surface is generally hexagonal said sides of said outer surface being for engaging jaws of a wrench holding and turning said threadless nut;

said inner side surface of said body defining a bore through said body between said first and second faces of said body, said bore having a center axis, said center axis of said bore and said center axis of said body being coaxial;

said inner side surface of said body having first and second portions, said first and second portions of said inner side surface of said body each being generally cylindrical and having a center axis and a diameter, said center axes of said first and second portions of said inner side surface of said body being coaxial with said center axis of said body;

said first portion of said inner side surface being positioned adjacent said first face of said body, said second portion of said inner side surface being positioned adjacent said second face of said body;

said diameter of said second portion of said inner side surface being greater than said diameter of said first portion of said inner side surface such that an annular shoulder is formed between said first and second portions of said inner side surface;

an annular liner being provided on said second portion of said inner side surface, said liner having a center axis, inner and outer diameters;

said center axis of said liner being coaxial with said center axis of said body;

said inner diameter of said liner being less than said diameter of said first portion of said inner side surface, said outer diameter of said liner being greater than said diameter of said first portion of said inner side surface;

said liner having a first end abutting said shoulder formed between said first and second portions of said inner side surface, said liner having a second end being positioned adjacent said second face of said body;

said second face of said body having an annular flange radiating inwards towards said center axis of said body and into an opening of said bore, said annular flange having an L-shaped cross-section including an inboard extent extending from said second face of said body in perpendicular relationship therewith and an outboard portion extending inwards towards said center axis, wherein said inboard extent and said outboard extent have a common uniform thickness, said inboard extent of said annular flange having a diameter being generally equal to said diameter of said second portion of said inner side surface, said annular flange having an inner edge having a diameter being generally equal to said diameter of said first portion of said inner side surface;

said annular flange abutting said second end of said liner;

wherein a width of said liner is greater than said first portion of said inner side surface; and wherein said liner comprises a malleable material including a polymeric resin compound that is adapted to be engaged by threads of the threaded bolt threadedly extended into said bore of said body such that the bolt is securely held to said nut.

* * * * *